US00H002278H

(19) United States
(12) Statutory Invention Registration
Underbakke

(10) Reg. No.: US H2278 H
(43) Published: Jul. 2, 2013

(54) ONBOARD DATA RECORDER FOR A NONDESTRUCTIVE TEST WIRE ROPE SENSOR HEAD

(75) Inventor: Larry Dean Underbakke, Wasilla, AK (US)

(73) Assignee: The United States of America, as represented by the Secretary of the Navy, Washington, DC (US)

(21) Appl. No.: 13/038,574

(22) Filed: Mar. 2, 2011

(51) Int. Cl.
*G01N 27/82* (2006.01)

(52) U.S. Cl. ..... 324/227; 324/235

(58) Field of Classification Search ..... 324/37, 324/206, 227, 228, 229, 232, 235, 238, 240–243; 360/112; 200/175–179
See application file for complete search history.

(56) References Cited

U.S. PATENT DOCUMENTS 4,096,437 A * 6/1978 Kitzinger et al. ..... 324/227
4,659,991 A * 4/1987 Weischedel ..... 324/241
5,565,771 A * 10/1996 Hamelin et al. ..... 324/225
5,804,964 A * 9/1998 Hamelin et al. ..... 324/242
6,492,808 B1 * 12/2002 Sukhorukov et al. ..... 324/242
2007/0267283 A1 * 11/2007 Hiroe et al. ..... 200/179
2012/0224278 A1 * 9/2012 Underbakke ..... 360/69

FOREIGN PATENT DOCUMENTS

EP 93830449.0 * 8/1993

OTHER PUBLICATIONS

Army Wire Rope Inspection Program.*

* cited by examiner

*Primary Examiner*—Daniel Pihulic
(74) *Attorney, Agent, or Firm*—Christopher Lon Blackburn

(57) ABSTRACT

A wire rope tester including a magnetic testing device; the wire rope tester includes a Remote Data Recorder mounted on a sensor head of the magnetic testing device.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ONBOARD DATA RECORDER FOR A NONDESTRUCTIVE TEST WIRE ROPE SENSOR HEAD

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

STATEMENT TO PUBLISH AS A STATUTORY INVENTION REGISTRATION

Applicants request this specification, including the claims, and drawings be published as a statutory invention registration.

FIELD OF THE INVENTION

The invention generally relates to a nondestructive test wire rope sensor(s).

It is to be understood that the foregoing and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION

Embodiments of the invention generally relate to a data recorder for a nondestructive test wire rope sensor head.

Figure 1:
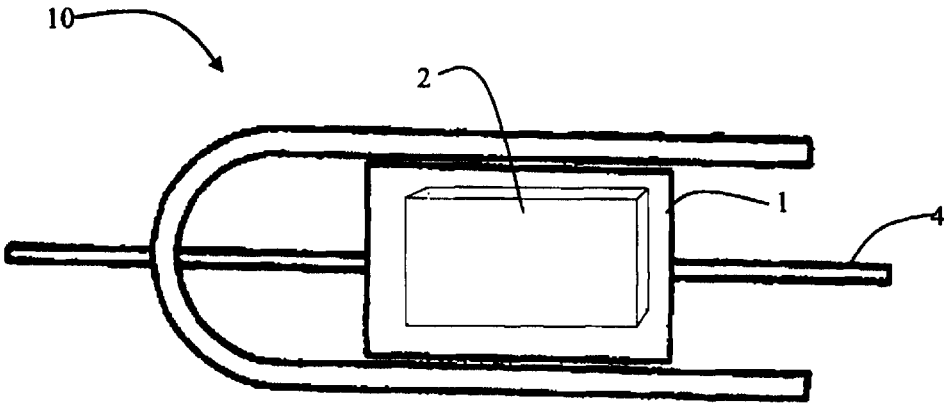
FIG. 1 illustrates a Magnograph TM having a Remote Data Recorder fastened thereon.

Shown in FIG. 1 is a general embodiment of a wire rope tester 10 using a known magnetic testing device 1 modified to have a RDR 2 mounted on the sensor head of the magnetic testing device 10. Implementation of embodiments of the invention is presented in the context of a wire rope tester 10 having a magnetic testing device (including associated components such as, for example, electronic and brush recorder sections) 1 such as disclosed in U.S. Pat. No. 4,096,437 that has been modified such that a RDR 2 is mounted on the sensor head of the magnetic testing device 1. U.S. Pat. No. 4,096,437 is incorporated herein. The magnetic testing device disclosed in U.S. Pat. No. 4,096,437, commercially available under the trademark MAGNOGRAPH.TM., as most of the other commonly used instruments in the field of Non Destructive Testing (NDT) of wire ropes, provides two informations: a loss of metallic area (LMA) signal and a local fault (LF) signal. Features of the MAGNOGRAPH.TM. derive from the physical measurement principle used in the sensor head. This principle, the Hall effect, makes possible magnetic flux density measurements in a magnetization circuit for both steady state and dynamic operation.

The MAGNOGRAPH.TM. has been used as the nondestructive magnetic testing device in this specification.

Those skilled in the art will, however appreciate that the RDR may be applied to other testers generating signals similar to those mentioned above, that is, signals generated from direct measurement of the magnetic flux density in LMA and LF measurement circuits.

With reference to FIG. 1, there is illustrated a general diagram of the magnetic testing device 1, which includes U-shaped magnets having a north pole and a south pole. Loss of metallic area sensors are placed at the end of the poles. Local fault sensors (or Hall sensors) are positioned between the poles of each magnet. In operation, a wire rope 4 is advanced into or through the magnetic testing device 1 of the wire rope tester 10.

Figure 2:
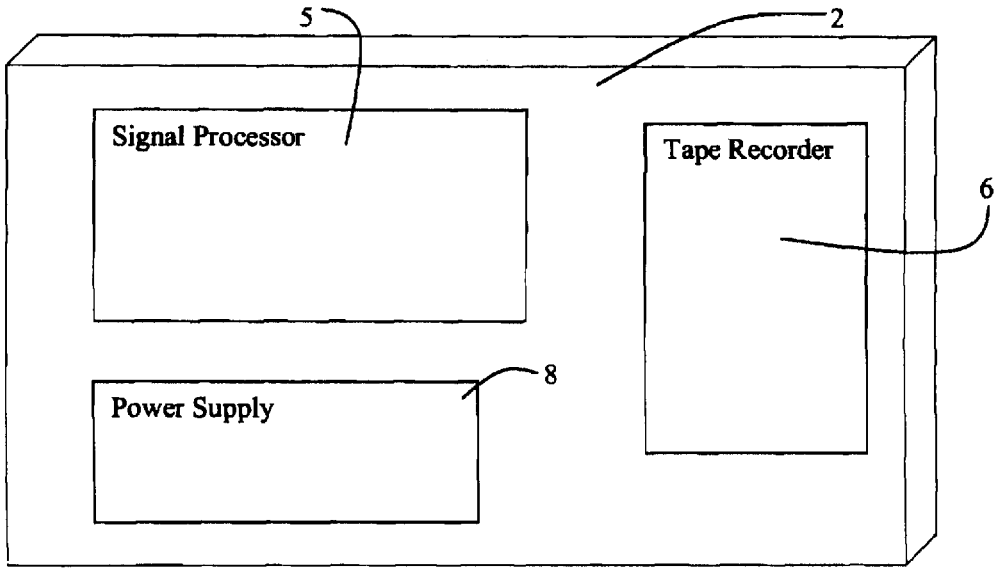
FIG. 2 illustrates using one embodiment of a Remote Data Recorder having a a unitized local fault and loss of metallic area signal processor ("signal processor"), multi-channel FM tape recorder, and power supply; the signal processor, tape recorder, and power supply are generally illustrated using text boxes.

With reference to FIGS. 1 and 2, embodiments of the invention include a remote data recorder ('RDR') 2 operatively associated with the sensor head of the magnetic testing device 1 of the wire rope tester 10. The RDR 2 includes a unitized local fault and loss of metallic area signal processor ("signal processor") 5, multi-channel FM tape recorder 6, and power supply 8, housed in a package that weighs less than the specified maximum attachable weight of the sensor head of the magnetic testing device 1 of the wire rope tester 10. The RDR's 2 measurements allow it to be attached (fixedly or removably) to the framework of the sensor head of the magnetic testing device 1 of the wire rope tester 10. Output of the signal processor 5 is fed to a multi-channel analog FM or digital tape recorder 6 for recording the information detected by the magnetic testing device 1. The resulting cassette can be removed at the end of the test, rewound, and played back on the electronic and brush recorder sections of the wire rope tester 10.

The signal processor 5 is an electronic processor operatively connected with the sensor head of the magnetic testing device 1 and is formed of integrated circuits that perform signal conditioning via a conditioning module, calibration and zeroing components, and distance transmitter logic. The Hall effect outputs of the magnetic testing device 1 are fed to the signal processor 5. Also fed to the signal processors is the output of a defect location sensor which may be in the form of a pair of rollers in contact with the wire rope 4 being tested. Such rollers may be provided with or coupled to suitable transducers producing an output signal at regular intervals from the starting end of the wire rope 4 being tested.

The signal processor 5 includes calibration and zeroing components. The calibration and zeroing is performed using a five-position rotary master switch for the LMA zero-gain control. The positions are off, insert zero, −10%, standby, standardize, and run. Turning the master switch through these positions calibrates the electronics (the electronic circuits built into the RDR to energize, condition, and record the signal from the Sensor Head). At the insert zero position, the calibration and zeroing components perform and provide a null reading with the wire rope and concentrator tube in place in the sensor head of the magnetic testing device 1. At the standby position, the calibration and zeroing components hold the preliminary settings. At the standardize setting, the calibration and zeroing components are used to obtain a null just before starting the test. The run setting starts the data collection and the RDR 2.

The conditioning module of the signal processor 5 includes an analog signal conditioner that takes the signal from the Hall Effect devices in the sensor head of the magnetic testing device 1 and amplifies and filters extraneous "noise". In some embodiments, the signal conditioning module includes an analog to digital conversion unit and a digital signal conditioner that provides the same manipulation of the data as with the analog signal after it samples and digitizes the signal.

Embodiments of the signal processor also include distance transmitter logic. The distance transmitter logic uses a pickup device to provide a pulse as the odometer moves. The logic circuit counts the pulses, multiplied times the known outer diameter of the odometer wheel to obtain the distance the sensor head of the magnetic testing device 1 has moved during the test. This provides an accurate distance from the start of the test to an identified location of a fault in the wire rope 4. The distances signals are manipulated and recorded on the RDR 2.

Some embodiments of an RDR 2 constructed in accordance with the principles of the invention include remote lime startup circuitry that allows the operator to start the tape recorder 6 either by manual or auto start mode. Auto start sets the recorder to start from 1 minute to 12 hours 59 minutes after the RDR 2 has been turned on and calibrated. This feature allows the wire rope tester 10 to be moved to a remote or inaccessible area and secured before the RDR 2 is started.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A data recorder comprising:

a nondestructive test wire rope sensor head; and a data recorder attached to, and operatively associated with, said sensor head; said data recorder being a plurality of components housed in a package.

2. The data recorder of claim 1 wherein said plurality of components comprises:

a unitized local fault and loss of metallic area signal processor;

a multi-channel FM tape recorder; and a power supply.

3. The data recorder of claim 2 wherein said unitized local fault and loss of metallic area signal processor comprises:

a conditioning module;

a calibration and zeroing components; and a distance transmitter logic.

4. The data recorder of claim 3 wherein said conditioning module comprises:

an analog signal conditioner that takes the signal from the Hall Effect Devices in the Sensor Head and amplifies the signal and filters out extraneous noise.

5. The data recorder of claim 4 wherein said conditioning module further comprises:

an analog to digital conversion unit; and a digital signal conditioner that provides the same manipulation of the data as with the analog signal after it samples and digitizes the signal from the Sensor Head.

6. The data recorder of claim 4 wherein said calibration and zeroing components comprise a five-position rotary master switch for the LMA zero-gain control, said five-position rotary master switch having the following five positions: off, insert zero, −10%, standby, standardize, and run.

7. The data recorder of claim 6 further comprising remote time startup circuitry that allows the operator to start said multi-channel FM tape recorder either by manual or auto start mode.

* * * * *